Patented Oct. 29, 1940

2,219,661

UNITED STATES PATENT OFFICE 2,219,661

PROCESS OF PREPARING INSOLUBLE ELASTIC RUBBERLIKE COMPOSITION

Ernst Schnabel, Berlin-Lichterfelde, Germany, assignor to Resistoflex Corporation, New York, N. Y., a corporation of New York No Drawing. Application September 23, 1938, Serial No. 231,341. In Germany February 13, 1936

5 Claims. (Cl. 260—83)

This invention relates to the production of a new synthetic substance having the properties of softness, elasticity, flexibility and stretchability, possessed by rubber, but without the deficiencies of rubber such as becoming hard with age and solubility in oil, benzene and similar fluid fuels.

The new substance of this invention is adapted to the production of hose, tubing, packing, diaphragms, coatings or linings, insulation and the like where insolubility in oils and fluid fuels or organic solvents is of particular advantage. This substance is also insoluble in water.

According to this invention the new substances are produced by the treatment in solution of polyacrylic acid derivatives, particularly the polyacrylic acid esters. The ethyl and methyl esters of polyacrylic acid are suitable starting materials, especially the methyl esters.

The invention broadly consists in treating polyacrylic acid derivatives in solution with certain agents which react to form new or altered substances which have the desired properties of flexibility, elasticity and especially insolubility in most organic solvents, even the solvents in which the polyacrylic acid derivative is initially soluble. The methyl ester of polyacrylic acid itself possesses to a certain extent the properties desired in the final product in that it forms a soft, flexible and elastic mass which is, however, soluble in benzol and a number of other organic solvents, making it of no use for the production of tubing, packing and the like in connection with the handling of solvents and fluid fuels. It has been found that when such polyacrylic acid derivatives are treated as hereinafter disclosed this undesired solubility can be eliminated, reduced or controlled. The treatment may be carried out by means of a variety of substances which are recognized as albumin precipitants, including tanning agents, heavy metals and certain heavy metal compounds, or mixtures of these.

It has been found that if a solution of polyacrylic acid ester has added to it finely divided metal, metal oxide, hydroxide, salt or salt-like compounds of metal, a reaction takes place producing a mass which is insoluble in water, benzol, benzine, alcohol, oil, or mixtures of these, and in most common organic solvents, even including those in which the polyacrylic acid ester is soluble, such for example as acetone, acetic ether and the like.

The metal or metal compounds may be added to a solution of the polyacrylic acid derivative in a dry or in a dissolved state. Or if the metal or metal compound is in solution in a solvent for the polyacrylic acid ester, the latter may be added as a dry material to the metal solution.

A wide range of metals and their compounds are adapted to this process including, for example, copper, iron, zinc, tin, antimony, cobalt and others. The metal compounds may be mixed with metal powder, and, with many metals, for example copper, the process may be carried out with an addition of pure metal in the form of a powder. A relatively small amount of the added metal or metal compound may be sufficient for producing the reaction, ranging from a small percent of the weight of the dry substance to less than one percent.

The reaction which takes place in the solution may become apparent as a coagulation which takes place immediately or after a substantial interval of time. It has been noted, however, that the readiness with which coagulation takes place depends upon the type or the degree of purity of the polyacrylic acid derivative. In some cases the addition of metal or metal compound will not result in coagulation although a reaction has nevertheless taken place, so that the substance which is obtained upon evaporation of the solvent has the desired insolubility.

The addition to a solution of polyacrylic acid ester of substances in the class recognized as albumin precipitants produces a reaction resulting in insolubility of the final product. Coagulation usually takes place, but not necessarily. For example, through the addition of tannic acid antimony compound a substance is obtained without coagulation which is insoluble in benzol and which is otherwise as insoluble as the ester before treatment. The addition of tannic acid iron compound results in strong coagulation, producing a substance likewise insoluble in benzol.

In forming the solutions of polyacrylic acid derivatives preparatory to treatment any solvent for the derivative may be used, including acetone and acetic ether (ethyl acetate).

The following is an example using a metal salt solution and tanning agent in conjunction:

Example 1

To 53 gr. of a 19% solution of polyacrylic acid methyl ester in acetic ether (containing 10 gr. of the dry substance) there is added 1 gr. of tannic acid and 7.5 c.c. of a filtered solution of 3 gr. ferric acetate in 17 cc. of water. This mixture coagulates strongly, yielding a light brown flexible substance insoluble in most organic solvents including benzol and acetic ether.

The following is an example of the use of a pure metal:

Example 2

Approximately 19 gr. of solid polyacrylic acid methyl ester is dissolved in 75 gr. of acetic ether with the addition of 3 cc. of water. When 2 gr. of metallic copper powder is added the substance coagulates and becomes insoluble even in the principal solvent for acrylic acid ester, namely acetic ether.

The substances obtained in this manner are characterized by being insoluble in water as well as in fluid fuels (benzine, benzol, alcohol, and their mixtures) and in oils of all kinds. They excel previously known synthetic substances of similar type in softness and plasticity without the addition of special softening agents. They are flexible and very resilient, that is, they are substantially without permanent deformation after being bent, stretched or compressed. The material exhibits no aging phenomena, as does rubber. It is not noticeably affected by climatic changes of temperature or humidity. Because of its high degree of softness and elasticity, large amounts of cheap fillers may be added to the mass prior to the start of coagulation without materially affecting its valuable properties.

As illustrated by the examples given above, the agent added to the solution of polyacrylic acid derivative may be a metal or metal compound by itself or a mixture of metal or metal compound and tanning agents. As the amount of tanning agent is increased the amount of metal or metal compound may be decreased. A similar result may be obtained by the addition of potassium permanganate which may be added gradually in small amounts to induce coagulation.

By proper selection of the reactant and its amount there is a wide range through which the solubility of the product relative to various solvents can be altered, producing substances suitable for various uses. For example, it may be desired to produce a soft rubberlike product insoluble in benzol and having high dielectric strength. In such case it is not dsired to use metal and unnecessary to achieve complete insolubility in all solvents. The following example is given as illustrative:

Example 3

Approximately 59 gr. of a 17% solution of polyacrylic acid methyl ester in acetic ether (10 gr. of dry material) has added to it 8% of antimony potassium tartrate and 10% of tannic acid. The solution does not coagulate but upon evaporation of the solvent yields a soft flexible substance entirely insoluble in benzol.

The reacted solution of the above example could be used as a coating or impregnating solution for fabric or the like by reason of the fact that it does not coagulate but merely solidifies upon evaporation of the solvent. Another method of forming such coatings on fabric or the like is also contemplated, however, using agents which will result in immediate coagulation. For example, a fabric may be first coated or impregnated with the metal, metal compound, or tanning agent, in solution if desired, and thereafter passed through a bath of the polyacrylic acid derivative in solution. The fabric will thereupon become enveloped in the coagulated mass. Still another method is to use a coagulating solution of such dilution that coagulation will take place very slowly, allowing time for coating, painting or impregnating.

Such a dilute solution as that just mentioned may also be used for spinning fibers, by a process similar to the cellulose spinning process, the solution being spun into a bath of water which causes coagulation.

The new substances obtained by the methods set forth may be formed into any desired shape by pressing, calendering or extruding, with little or no loss of softness or plasticity. Temperatures of from 50° to 80° C. have been found suitable for forming. Thus tubes, bands, ribbons, filaments and shaped articles may easily be manufactured. Those new substances which are produced by coagulation are preferably formed prior to the complete removal of the solvent by evaporation while those substances which result from evaporation of an uncoagulated solution may be worked up even after the solvent has apparently been completely evaporated.

What is claimed is:

1. The method of making a substantially insoluble elastic rubberlike composition, which comprises dissolving an ester of polyacrylic acid and a monohydric aliphatic alcohol of not more than two carbon atoms in a suitable solvent, and treating said ester while in solution with an agent comprising metallic copper in finely divided form in an amount sufficient to produce coagulation, and separating the coagulated material from the excess solvent.

2. The method of making a substantially insoluble elastic rubberlike composition, which comprises dissolving an ester of polyacrylic acid and a monohydric aliphatic alcohol of not more than two carbon atoms in a suitable solvent, treating said ester while in solution with an agent comprising copper and a copper compound, and separating the resulting product from the solvent.

3. The method of making a substantially insoluble elastic rubberlike composition, which comprises dissolving the methyl ester of polyacrylic acid in a suitable solvent, treating said ester while in solution with an agent comprising copper and a copper compound, and separating the resulting product from the solvent.

4. The method of making a substantially insoluble elastic rubberlike composition, which comprises dissolving an ester of polyacrylic acid and a monohydric aliphatic alcohol of not more than two carbon atoms in a suitable solvent, treating said ester while in solution with an agent comprising a copper compound, and separating the resulting product from the solvent.

5. The method of making a substantially insoluble elastic rubberlike composition, which comprises dissolving polyacrylic acid methyl ester in ethyl acetate containing a small amount of water, treating said ester while in solution with an agent comprising finely divided metallic copper, and separating the coagulated material from the excess solvent.

ERNST SCHNABEL.